(No Model.)
W. McINTOSH.
CROSS HEAD PUSHING DEVICE.
No. 359,803. Patented Mar. 22, 1887.
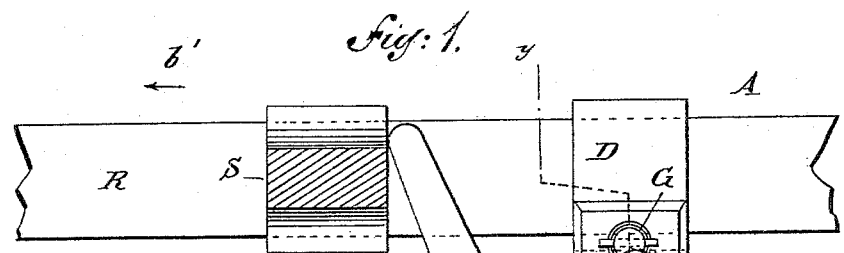
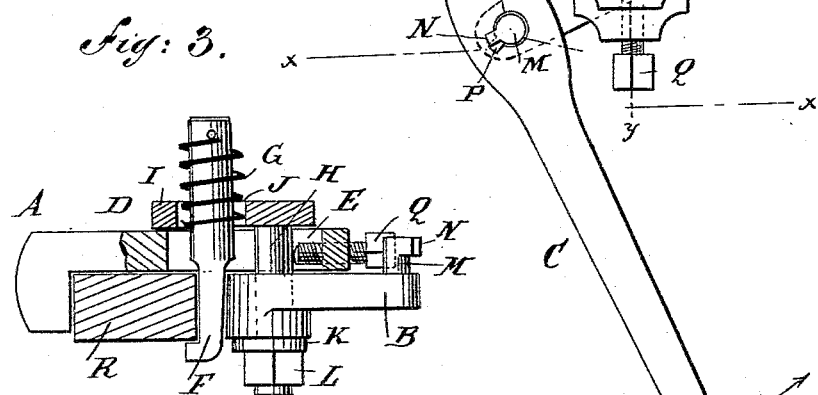
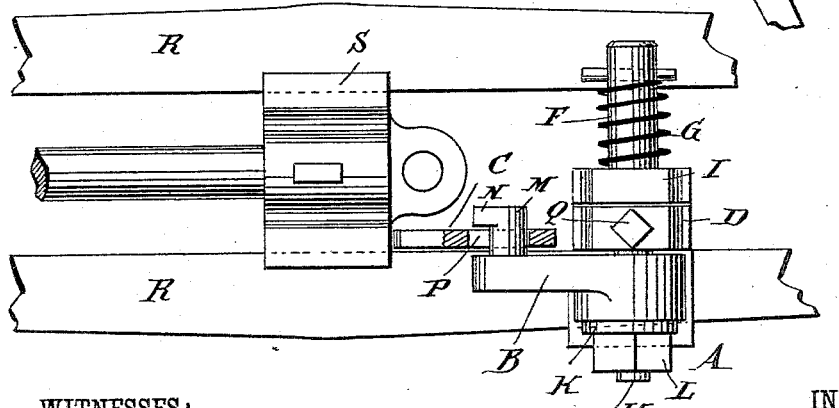
WITNESSES:
Chas. Niola
C. Sedgwick
INVENTOR:
W. McIntosh
BY Munn & Co.
ATTORNEYS.

UNITED STATES PATENT OFFICE.

WILLIAM McINTOSH, OF HURON, DAKOTA TERRITORY.

CROSS-HEAD-PUSHING DEVICE.

SPECIFICATION forming part of Letters Patent No. 359,803, dated March 22, 1887.

Application filed June 29, 1886. Serial No. 206,610. (No model.)

*To all whom it may concern:*

Be it known that I, WILLIAM McINTOSH, of Huron, in the county of Beadle, and in the Territory of Dakota, have invented a new and Improved Cross-Head-Pushing Device, of which the following is a full, clear, and exact description.

The object of my invention is to provide a new and improved device for moving the cross-head of a steam-engine without the aid of steam.

The invention consists of an adjustable clamping device, of a reversible crank-arm, and of a detachable lever fulcrumed on the said arm.

The invention also consists of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of my improvement, showing the cross-head in section. Fig. 2 is a sectional side elevation of the same on the line $x\,x$ of Fig. 1; and Fig. 3 is a vertical cross-section of the same on the line $y\,y$ of Fig. 1, with the lever removed and the crank-arm B in full view.

In a steam-engine it is frequently necessary to move the cross-head and its connections without the aid of steam, for which purpose I have provided a device, presently to be described, which accomplishes this object, and is also adaptable to the various shapes and forms of guide-bars in engines and locomotives.

The device consists, principally, of three parts—viz., the clamp A, attachable to the guides, a reversible crank-arm, B, pivoted on the same, and a lever, C, fulcrumed on the crank-arm. The clamping device A is provided with the angular bar D, having a slot, E, through which passes the angular clamping-plate F, on which is coiled a spring, G, one end of which rests on the bar D, its upper end abutting against a pin secured in the angular clamping pin or plate F. A stud, H, also passes through the slot E of the bar D, and is provided on one end with a plate, I, resting on the bar D, and having an aperture, J, through which passes the plate F and spring G. On the stud H turns the crank-arm B, held against the bar D by the washer K and the nut L, and provided on its end with a pin, M, having a lug, N. The lever C is provided with an aperture, O, and a notch, P, which fits over the pin M and its lug N, which latter prevents the lever C from disengaging the pin M, when the lever C is placed on the said pin M and turned to one side, so that the lug N and the notch P are not directly in line, as shown in Fig. 1. A set-screw, Q, screws on the end of the bar D and against the stud H.

The operation is as follows: The angular clamping-bar D and the angular clamping-plate F are fitted on one of the guides R, in which slides the cross-head S to be moved. The clamping-plate F can be adjusted to any thickness of guide R, as the spring G yields accordingly, and it can also be set to any width of guide R by sliding the plate I on the bar D and regulating this movement by means of the set-screw $q$. The lever C is then placed on the crank-arm B, the pin M being its fulcrum, so that one end of the lever C rests against the cross-head S, as shown in Figs. 1 and 2, and by then moving the other end of the lever C in the direction of the arrow $a'$ the cross-head and its connections are caused to move in the direction of the arrow $b'$. As the inner side of the crank-arm B is slightly beveled, as shown in Fig. 3, it acts as a cam against the plate F, and thereby holds the latter securely against the guide R, and also prevents the crank-arm B from moving outward. The crank-arm B can be used on either side of the clamping-bar D. The cross-head S can be moved to any distance, forward or backward, on the guides R by adjusting the clamping device A again after a movement is accomplished.

Having thus fully described my invention, I claim as new and desire to secure by Letters Patent—

1. In a cross-head-pushing device, the combination of an adjustable clamping device with a reversible crank-arm and a lever fulcrumed on the said crank-arm, substantially as shown and described.

2. In a cross-head-pushing device, the combination of the clamping-plate D, having the aperture E, with the angular plate F and the spring G, substantially as shown and described.

3. In a cross-head-pushing device, the combination of an adjustable clamping device, A, with the crank-arm B, provided with the pin M, having the lug N, and the lever C, having the aperture O and the notch P, substantially as shown and described.

4. In a cross-head-pushing device, the angular clamping-bar D, having the slot E, the angular plate F, the spring G, and the set-screw Q, in combination with the crank-arm B and the stud H, secured to the plate I, having the aperture J, substantially as shown and described.

5. In a cross-head-pushing device, the angular clamping-bar D, having the slot E, the angular plate F, the spring G, and the set-screw Q, in combination with the crank-arm B, the pin M, secured to the said crank-arm B and provided with the lug N, the stud H, secured to the plate I, having the aperture J, and the lever C, having the aperture O and the notch P, substantially as shown and described.

WILLIAM McINTOSH.

Witnesses:
WM. B. STERLING,
L. H. STARKEY.